Dec. 28, 1965   B. W. ALLEN   3,225,368
AUTOMATIC SUNKEN WATERCRAFT MARKER BUOY
Filed June 30, 1964
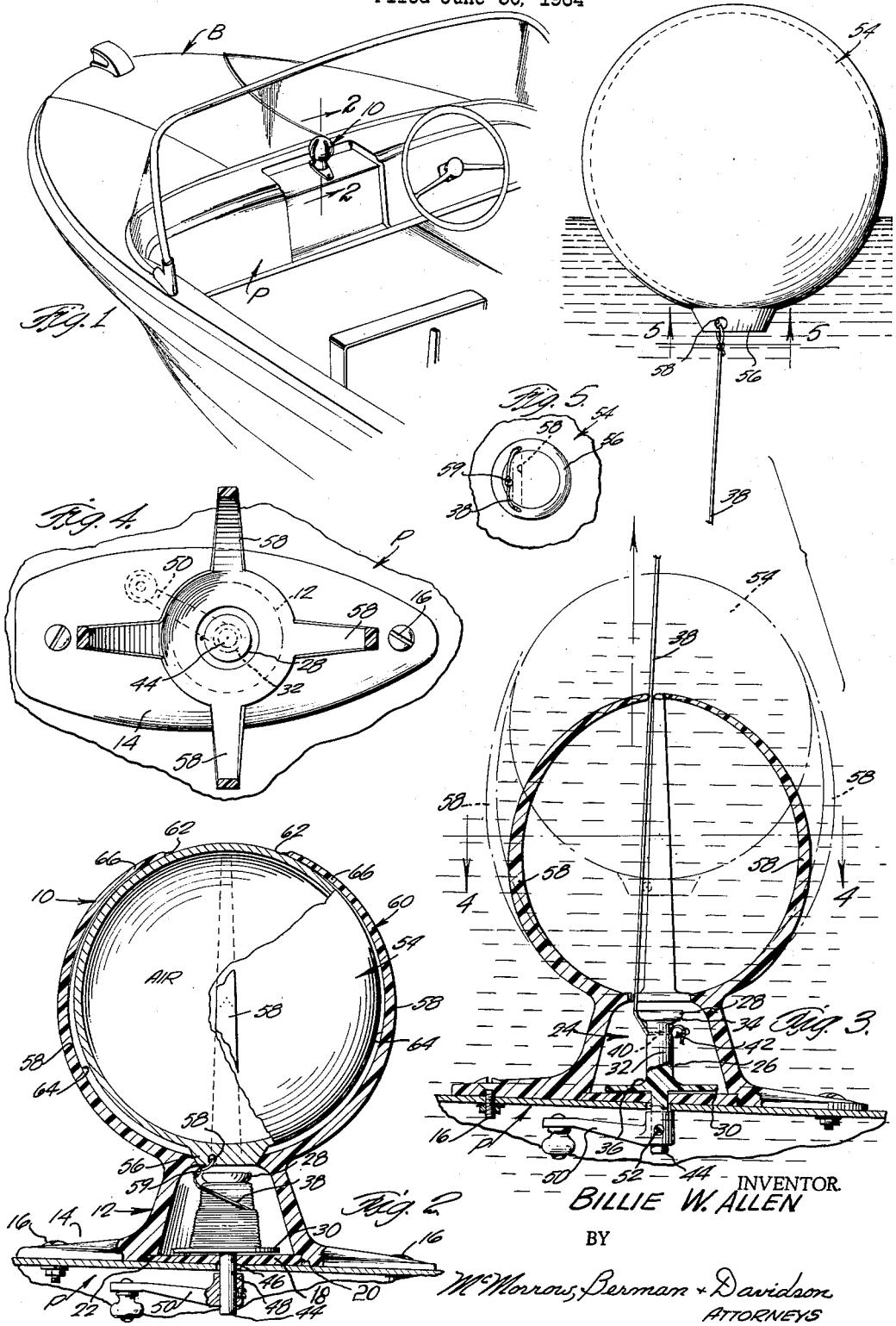
INVENTOR.
BILLIE W. ALLEN United States Patent Office 3,225,368
Patented Dec. 28, 1965

3,225,368
AUTOMATIC SUNKEN WATERCRAFT
MARKER BUOY
Billie W. Allen, 415 N. Mesa Verde, Aztec, N. Mex.
Filed June 30, 1964, Ser. No. 379,306
4 Claims. (Cl. 9—9)

This invention relates to an automatic sunken watercraft marker buoy.

The primary object of the invention is the provision of a simple, sightly, reliable, and practical device of the kind indicated, which serves not only to mark the location of sunken watercraft, but as a means for determining the depth at which the watercraft lies.

Another object of the invention is the provision of a device of the character indicated above which comprises a housing within which is mounted a line reel, having an external crank handle, on which is reeled a line which is connected to a float, the housing being adapted to be secured to any suitable exposed or external surface of a watercraft, the line having differently colored portions, indicating different depths of submersion of a sunken watercraft, when the slack in the line is pulled up at the surface of the water.

A further object of the invention is the provision, in a device of the character indicated above, of a float retaining cage, on the housing, which comprises resilient float gripping fingers, which while retaining the float safely against displacement, by such as wind, while the watercraft is afloat, are sufficiently yielding that when the watercraft submerges, the buoyancy of the float in water is sufficient to displace the fingers and free the float to rise to the surface of the water.

In the drawings:

FIGURE 1 is a schematic perspective view, showing a device of the invention installed on the instrument panel of a motor boat;

FIGURE 2 is an enlarged vertical transverse section taken on the line 2—2 of FIGURE 1;

FIGURE 3 is a contracted schematic sectional end elevational view, showing the float released from its cage and risen to the top of the water, the fingers of the cage being shown in normal positions, in solid lines, and in displaced positions, in phantom lines;

FIGURE 4 is a horizontal section taken on the line 4—4 of FIGURE 3; and,

FIGURE 5 is a fragmentary bottom plan view, taken on the line 5—5 of FIGURE 3.

Referring in detail to the drawings, a device of the present invention, generally designated 10, is shown mounted on the instrument panel P of a motor boat B for purposes of illustration only, since the device can be mounted on any exposed or external surface of any type of watercraft.

The device 10 comprises a hollow upwardly tapering, preferably cylindrical housing 12, constructed of suitable non-corrosive metal or plastic material, having a horizontal oval lateral mounting flange 14, on its lower end, which is adapted to be secured to the instrument panel P, as by means of bolts 16. The otherwise open lower end of the housing 12 is closed by a removable disc 18, which rests upon the upper surface of the panel P, and is threaded, as indicated at 20, in a groove 22, formed in the lower end of the housing.

A line reel 24 is enclosed within the housing 12, and comprises a spool 26 having a relatively small diameter head 28, on its upper end, and a relatively large diameter head 30, on its lower end. The facing surfaces of the heads 28 and 30 are curvedly fared into surface of the body 32 of the reel, as indicated at 34 and 36, respectively, to facilitate unwinding and winding of a line 38.

The line 38 is passed from one side of the spool body 32 to the other through a radial bore 40, which is located close to but spaced downwardly from the upper reel head 28, and terminates in a bead 42, larger in diameter than the bore, which engages said other side of the spool body.

The spool body 32 has a reduced diameter axial pintle 44, on its lower end, which is journaled through a hole 46, provided centrally in the disc 18, and extends down through a hole 48 formed in the instrument panel P, below which a crank handle 50 is secured in the pintle, as indicated at 52. The handle 50 is used for rewinding the line 38 on the reel, after use of the device.

The end of the line 38 remote from the reel 24 is secured to the underside of a float 54. The float 54, while shown herein as a hollow sphere, can be of any other suitable shape or construction, and be made of suitable non-corrosive metal or plastic material. The float has a centered downwardly tapered flat boss 56, on its underside, which is formed with an eccentric chordal horizontal bore 58, through which the related line end is adapted to be passed and tied, as indicated at 59.

The float 54 is normally secured in place, on the top of the housing 12, with the smaller lower end of its boss 56 in the upper end of the housing, by means of equally circumferentially spaced fingers 58, forming a float-retaining cage 60, which is preferably integral with the housing 12.

The fingers 58, as herein illustrated for the extension of the spherical float 54 are substantially semi-circular in form, and radiate from the top of the housing 12. The fingers taper in cross section upwardly from their lower ends, and have internally beveled tips 62, at their upper ends. The fingers are made resilient and flexible and are upwardly tapered to increase their flexibility toward their upper ends, for gradient releasing of the float, when submerged, and the beveled tips 62 are provided to facilitate release of the float, as it passes these tips, without undue friction.

As shown in FIGURE 2, the inner surfaces 64 of the fingers 58, while generally conforming in curvature to the surface of the float 54, are out of contact therewith, except for the upper portions 66 of the fingers, which bear downwardly upon the top of the float with sufficient pressure to hold the float securely in place, against displacement by such as strong winds.

In operation, should the boat B submerge and sink below the top of the water, the buoyancy of the float 54 in the water causes the float to pull upwardly out of the cage 60 and draw the line 38 with it off the reel 24, until the boat reaches and settles on the bottom, and then floats on the surface of the water so as to mark the location of the boat.

A salvage crew, on reaching the floating float 54 can then determine the depth at which the boat lies, by pulling the line 38 upwardly to eliminate slack therein, and noting the depth-indicating colored portion of the line exposed at the surface of the water.

What is claimed is:

1. A device of the character described comprising a mounting flange, a hollow housing fixed on and extending laterally from said flange, said housing having an open outer end and an opposite open inner end, a cage fixed on said outer end, said cage comprising circumferentially spaced resilient and flexible fingers, said fingers being angled toward each other, a float releasably engaged between fingers of the cage, a line secured at one end to the float and at its other end to the housing, means closing the inner end of the housing, a reel enclosed within the housing, said reel comprising a spool journaled through said means, the line being wound on and secured to the spool, and an operating handle operatively connected to said spool at the side of said means remote from the housing.

2. The device of claim 1, wherein said float is substantially spherical, and said fingers are longitudinally and laterally outwardly bowed.

3. The device of claim 1, wherein said float is substantially spherical, and said fingers are longitudinally and laterally outwardly bowed, said fingers having beveled tips normally bearing upon the top of the float.

4. The device of claim 1, wherein said float is substantially spherical, and said fingers are longitudinally and laterally outwardly bowed, said float having a tapered boss to which the line is secured, said boss being adapted to seat in the outer end of the housing.

References Cited by the Examiner

UNITED STATES PATENTS

| | | | |
|---|---|---|---|
| 1,188,308 | 6/1916 | Nyquist | 9—9 |
| 1,211,989 | 11/1917 | Westin | 9—9 |
| 1,605,343 | 11/1926 | Gould et al. | 9—9 X |
| 1,636,447 | 7/1927 | Standish | 9—9 X |
| 2,738,524 | 3/1913 | Peay | 9—9 |

FOREIGN PATENTS 278,836   3/1913   Germany.

MILTON BUCHLER, *Primary Examiner.*

FERGUS S. MIDDLETON, *Examiner.*